United States Patent
Widstrom et al.

(10) Patent No.: US 11,631,892 B2
(45) Date of Patent: Apr. 18, 2023

(54) HIGH PERFORMANCE AIR STABLE SOLID POLYMER ELECTROLYTE

(71) Applicants: University of Maryland, College Park, College Park, MD (US); The United States of America as Represented by the Secretary of the Army, Washington, DC (US)

(72) Inventors: Matthew D. Widstrom, Ellicott City, MD (US); Peter Kofinas, N. Bethesda, MD (US); Arthur V. Cresce, Beltsville, MD (US); Kang Xu, Potomac, MD (US)

(73) Assignees: University of Maryland, College Park, College Park, MD (US); The United States of America as Represented by the Secretary of the Army, Washington, DC (US)

( * ) Notice: Subject to any disclaimer, the term of this patent is extended or adjusted under 35 U.S.C. 154(b) by 323 days.

(21) Appl. No.: 16/241,813

(22) Filed: Jan. 7, 2019

(65) Prior Publication Data
US 2020/0028210 A1    Jan. 23, 2020

Related U.S. Application Data

(60) Provisional application No. 62/613,858, filed on Jan. 5, 2018.

(51) Int. Cl.
*H01M 10/052* (2010.01)
*H01M 10/0565* (2010.01)
*H01M 10/0525* (2010.01)
*H01M 4/58* (2010.01)
*H01M 4/505* (2010.01)
*H01M 4/38* (2006.01)

(52) U.S. Cl.
CPC ......... *H01M 10/0565* (2013.01); *H01M 4/38* (2013.01); *H01M 4/505* (2013.01); *H01M 4/5825* (2013.01); *H01M 10/0525* (2013.01); *H01M 2300/0082* (2013.01)

(58) Field of Classification Search
CPC ........... H01M 10/052; H01M 10/0525; H01M 10/0565; H01M 4/38; H01M 4/505; H01M 5/58
See application file for complete search history.

(56) References Cited

U.S. PATENT DOCUMENTS 6,232,019 B1 * 5/2001 Wunder ............ H01M 10/0565
429/300
9,252,456 B2    2/2016 Kofinas et al.
(Continued)

OTHER PUBLICATIONS

Suo et al. (Angew. Chem. Int. Ed. 2016, 55, 7136-7141).*
(Continued)

*Primary Examiner* — Olatunji A Godo
(74) *Attorney, Agent, or Firm* — Sterne, Kessler, Goldstein & Fox P.L.L.C.

(57) ABSTRACT

The present invention is directed to aqueous solid polymer electrolytes that comprise a lithium salt and battery cells comprising the same. The present invention is also directed to methods of making the electrolytes and methods of using the electrolytes in batteries and other electrochemical technologies.

23 Claims, 6 Drawing Sheets

(56) References Cited

U.S. PATENT DOCUMENTS

| | | | |
|---|---|---|---|
| 2006/0204854 A1* | 9/2006 | Fujimoto | H01G 11/56 |
| | | | 429/303 |
| 2013/0089777 A1* | 4/2013 | Tatsumi | H01M 10/0568 |
| | | | 429/199 |
| 2013/0126803 A1* | 5/2013 | Giroud | H01M 4/5825 |
| | | | 252/519.33 |
| 2013/0157143 A1* | 6/2013 | Hoshiba | H01M 10/02 |
| | | | 429/304 |
| 2014/0220476 A1* | 8/2014 | Hirashita | H01M 10/052 |
| | | | 429/498 |
| 2016/0351968 A1* | 12/2016 | Wang | H01M 4/48 |

OTHER PUBLICATIONS

Ghosh, A., et al., "PEO based block copolymer as solid state lithium battery electrolyte," *ECS Transactions* 11(29):131-137, The Electrochemical Society, United States (2008).

Jiang, Y., et al. "Development of the PEO based solid polymer electrolytes for all-solid state lithium ion batteries," *Polymers* 10:1237 (13 pages), MDPI AG, Switzerland (2018).

* cited by examiner

HIGH PERFORMANCE AIR STABLE SOLID POLYMER ELECTROLYTE

STATEMENT REGARDING FEDERALLY SPONSORED RESEARCH OR DEVELOPMENT

This invention was made jointly with the United States of America, as represented by the Secretary of the Army (ARL), with government support under 201414082800003 awarded by the Central Intelligence Agency (CIA). The government has certain rights in this invention.

BACKGROUND OF THE INVENTION

Field of the Invention

The present invention describes aqueous solid polymer electrolytes that comprise a lithium salt and battery cells comprising the same. The present invention is also directed to methods of making the electrolytes and methods of using the electrolytes in batteries and other electrochemical technologies.

Background of the Invention

Rechargeable batteries that output high cell voltages (>3.0 V) typically utilize non-aqueous and aprotic solvents to dissolve conducting salts, because these solvents are able to afford the stability against the oxidative or reductive reactions incurred by electrode surfaces of extreme potentials. Because electrolyte components are almost never thermodynamically stable on strongly reductive surfaces of the anode or strongly oxidative surfaces of the cathode, electrochemical stability is rather attained through the passivation of the electrode surfaces.

Commonly, the component in a Li-ion battery that makes an interface between the two electrodes is an electrolyte. Traditionally, liquid electrolytes were used in Li-ion batteries due to their efficient ion transport ability across the two electrodes. However, liquid electrolytes suffer from limitations such as problems in storage and transportation, leakage at the electrode-electrolyte interfaces, and difficulties in handling and processing. Solid electrolytes are superior to liquid electrolytes in several aspects: stability, enhanced electrode-electrolyte compatibility, less likely to leak, and flexibility. However, the limitation of low ionic conductivity curtails the use of solid electrolytes in Li-ion batteries.

State-of-the-art battery chemistries using such non-aqueous electrolytes suffer from high flammability of these organic solvents, as well as the toxicity with the fluorophosphates anions of Li, Na, and other metal salts. Non-aqueous electrolytes used to dissolve Mg and Al are typically very dangerous and reactive Lewis acid solutions known as Grignard reagents are highly toxic and corrosive. The moisture-sensitivity and high reactivity of these non-aqueous electrolyte components also require special moisture exclusion facilities during manufacturing and processing, thus causing additional costs. In addition to the direct costs incurred by these expensive electrolyte components, the potential safety hazards associated with these highly reactive electrolyte components also adds to the final cost of the battery packs, where expensive packaging and electronic protective devices and safety management have to be used.

Aqueous electrolytes could resolve these concerns; however, their electrochemical stability window (1.23 V) is too narrow to support most of the electrochemical couples used in Li-ion batteries. In particular, hydrogen evolution at the anode presents the gravest challenge because it occurs at a potential (between approximately 2.21-3.04 V vs. Li (depending on the pH value)) far above where most Li-ion battery anode materials operate. Even in trace amounts, hydrogen severely deteriorates the electrode structure during cycling.

The present invention describes a new class of aqueous polymer electrolytes that are sufficiently stable to accommodate Li-ion battery chemistries and when employed in full cells can operate with cell voltages greater than 3 V. These aqueous polymer electrolytes are able to accommodate high concentrations of various lithium salts.

BRIEF SUMMARY OF THE INVENTION

The present invention describes an electrolyte, comprising:
(a) at least one lithium salt in water; and
(b) at least one polymer;
wherein the molality of the lithium salt to water is between about 1 and about 30, and
wherein the ionic conductivity of the electrolyte at 25° C. is between about 1 mS/cm and about 10 mS/cm.

In some embodiments, the at east one lithium salt comprises an anion selected from the group consisting of bis (trifluoromethane sulfonyl)imide ($TFSI^-$), trifluoromethane sulfonate ($TF^-$), bis(fluorosulfonyl)imide ($FSI^-$), tetrafluorophosphate ($BF_4^-$), hexafluorophosphate ($PF_6^-$), bis(perfluoroethyl sulfonyl) imide ($BETI^-$), 4,5-dicyano-2-trifluoromethanoimidazole ($DCMI^-$), [fluoro(nonafluorobutane) sulfonyl]imide ($FNF^-$), perchlorate ($ClO_4^-$), sulfate ($SO_4^-$), bis(oxalate)borate ($BOB^-$), dicyanamide ($C_2N_3^-$), nitrate ($NO_3^-$), acetate ($CH_3CO_2^-$), chloride ($Cl^-$), bromide ($Br^-$), and iodide ($I^-$).

In some embodiments, the electrolyte comprises one lithium salt.

In some embodiments, the at least one lithium salt is LiTFSI.

In some embodiments, the molality of the lithium salt to water is between about 20 and about 25.

In some embodiments, the at least one polymer is selected from the group consisting of polyethylene oxide, polyacrylonitrile, polyvinylidene fluoride, poly(methyl acrylate), poly(methyl methacrylate), poly(oxymethylene), and polystyrene.

In some embodiments, the at least one polymer is polyethylene oxide or polyacrylonitrile.

In some embodiments, the molecular weight ($M_w$) of the at least one polymer is between about 100,000 g/mol and about 4,000,000 g/mol.

In some embodiments, the electrolyte further comprises at least one ionic liquid.

In some embodiments, the ionic liquid comprises an anion selected from the group consisting of bis(trifluoromethane sulfonyl)imide ($TFSI^-$), trifluoromethane sulfonate ($TF^-$), bis(fluorosulfonyl)imide ($FSI^-$), tetrafluorophosphate ($BF_4^-$), hexafluorophosphate ($PF_6^-$), bis(perfluoroethyl sulfonyl) imide ($BETI^-$), 4,5-dicyano-2-trifluoromethanoimidazole ($DCMI^-$), [fluoro(nonafluorobutane)sulfonyl]imide ($FNF^-$), perchlorate ($ClO_4^-$), sulfate ($SO_4^-$), bis(oxalate) borate ($BOB^-$), dicyanamide ($C_2N_3^-$), nitrate ($NO_3^-$), acetate ($CH_3CO_2^-$), chloride ($Cl^-$), bromide ($Br^-$), and iodide ($I^-$).

In some embodiments, the ionic liquid comprises a cation selected from the group consisting of imidazolium, pyrrolidinium, pyridinium, phosphonium, ammonium, guanidinium, piperidinium, and sulfonium.

In some embodiments, the mass ratio of the at least one polymer to the at least one lithium salt is between about $1:10^7$ and about $10^7:1$.

In some embodiments, the mass ratio of the at least one polymer to the at least one lithium salt is 3:10.

In some embodiments, the electrolyte has an electrochemical stability window between about 0.75 V and about 7 V.

In some embodiments, the electrolyte has an electrochemical stability window between about 5.5 V and about 6.5 V.

In some embodiments, the ionic conductivity of the electrolyte at 25° C. is between about 1 mS/cm and about 4 mS/cm.

In some embodiments, the electrolyte is selected from the group consisting of:
  (a) the lithium salt LiTFSI and the polymer polyethylene oxide, wherein the molality of the lithium salt to water is about 21 molal, and the molecular weight of polyethylene oxide is about 1 million;
  (b) the lithium salt LiTFSI and the polymer polyacrylonitrile, wherein the molality of the lithium salt to water is about 22 molal, and molecular weight of polyacrylonitrile is about 100,000;
  (c) the lithium salt LiTFSI and the polymer polyethylene oxide, wherein the molality of the lithium salt to water is about 21 molal, and the molecular weight of polyethylene oxide is about 4 million; and
  (d) the lithium salts LiTFSI and LiTF and the polymer polyethylene oxide, wherein the molality of LiTFSI to water is about 21 molal, the molality of LiTF to water is about 7 molal, and the molecular weight of polyethylene oxide is about 1 million.

The present invention also describes an electrochemical battery cell comprising:
  (a) and electrolyte comprising at least one lithium salt in water and at least one polymer; wherein the molality of the lithium salt to water is between about 1 and about 30, and wherein the ionic conductivity of the electrolyte at 25° C. is between about 1 mS/cm and about 10 mS/cm;
  (b) an anode; and
  (c) a cathode.

In some embodiments, the anode is selected from the group consisting of $LiCoO_2$, $LiNi_{0.33}Mn_{0.33}Co_{0.33}O_2$, $LiNi_{0.5}Mn_{1.5}O_2$, $LiCoPO_4$, $LiFePO_4$, $LiNiPO_4$, $Li_2TiO_3$, $LiMn_2O_4$, $LiCoO_2$, and $Li_4Ti_5O_{12}$.

In some embodiments, the cathode is selected from the group consisting of lithium, magnesium, aluminum, zinc, chromium, iron, nickel, tin, lead, hydrogen, copper, silver, palladium, mercury, platinum, gold, molybdenum, sulfur, combinations thereof, and oxides thereof.

In some embodiments, the cathode is aluminum and the anode is $LiFePO_4$.

In some embodiments, the cathode is sulfur and the anode is $LiMn_2O_4$.

In some embodiments, the molality of the lithium salt to water in the battery cell is between about 20 and about 25.

The present invention also describes a method of preparing an electrolyte comprising:
  (a) admixing at least one lithium salt in water and at least one polymer; wherein the molality of the lithium salt to water is between about 1 and about 30, and wherein the ionic conductivity of the electrolyte at 25° C. is between about 1 mS/cm and about 10 mS/cm; and
  (b) pressing the admixture of (a) at a temperature between about 30° C. and about 150° C. and at a pressure between about 0.2 metric tons and about 2 metric tons.

In some embodiments, the electrolyte is a thin film having a thickness between about 50 μm and about 300 μm.

In some embodiments, the molality of the lithium salt to water in the admixture is between about 20 and about 25.

Also described is a thin film electrolyte obtained by the methods described herein.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention. The following drawings are given by way of illustration only, and thus are not intended to limit the scope of the present invention.

DETAILED DESCRIPTION OF THE INVENTION

Figure 1:
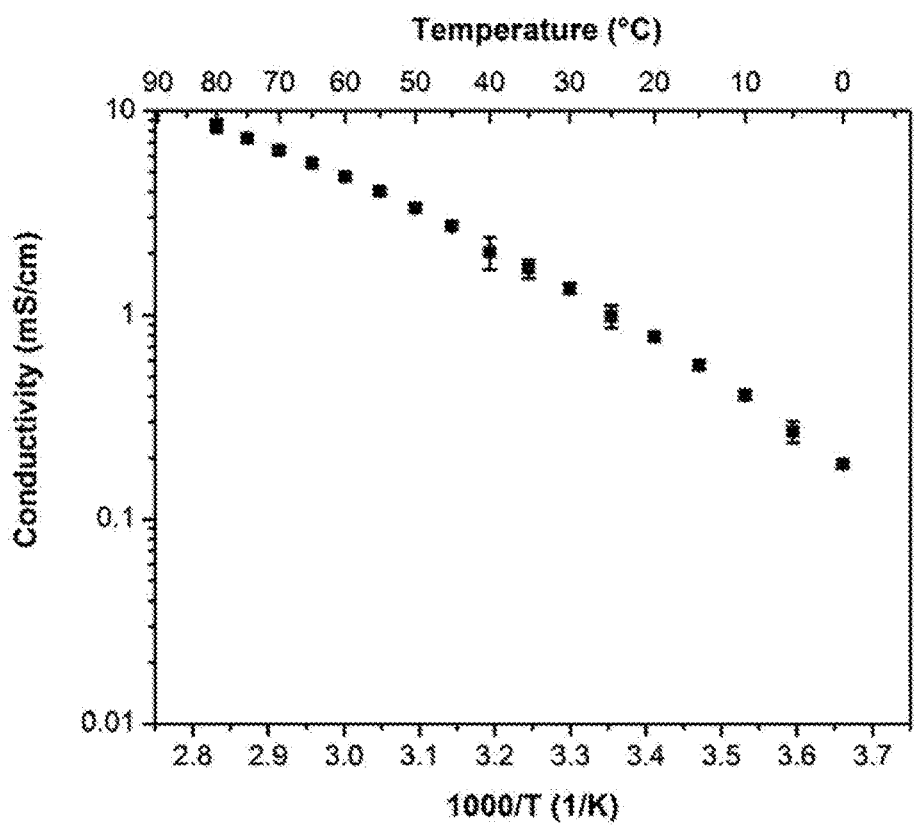
FIG. 1 is a graph of conductivity versus inverse temperature for a solid polymer electrolyte (21 molal solution of lithium bis(trifluoromethylsulfonyl) imide (LiTFSI) salt in water mixed with poly(ethylene oxide) (PEO) polymer (MW=1 million) (10:3 mass ratio) hot-pressed at 85° C.) measured by impedence spectroscopy. Temperature was taken from 0° C. to 80° C. The conductivity of the solid polymer electrolyte was shown to be 0.99 mS/cm at 25° C.

As used herein, the singular terms "a" and "the" are synonymous and used interchangeably with "one or more" and "at least one," unless the language and/or context clearly indicates otherwise. As used herein, the term "comprising" means including, made up of, and composed of.

All numbers in this description indicating amounts, ratios of materials, physical properties of materials, and/or use are to be understood as modified by the word "about," except as otherwise explicitly indicated. The term "about" as used herein includes the recited number±10%. Thus, "about ten" means 9 to 11.

The term "aqueous electrolyte" as used herein, refers to an electrolyte composition that contains water. In some embodiments, the content of water in the aqueous electrolyte is between 1% and 99%.

The term "molecular compound" as used herein, refers to any compound that does not dissociate into ions under normal (ambient) conditions.

The term "ionic compound" as used herein, refers to any compound that dissociates into ions under normal (ambient) conditions.

The term "metal compound" as used herein, refers to any metal from the alkali metals (e.g., Li, Na), the alkali earth metals (e.g., Mg, Ca), the transition metals (e.g., Fe, Zn), or the post-transition metals (e.g., Al, Sn). In some embodiments, the metal compound is Li, Na, K, Mg, or Al.

The term "metal salt" as used herein, refers to any compound that can be dissociated by solvents into metal ions and corresponding anions.

The "molality" (m) of a solution is defined as the amount of substance (in moles) of solute, $n_{solute}$, divided by the mass (in kg) of the solvent, $m_{solvent}$.

$$molality = n_{solute}/m_{solvent}$$

The unit for molality (m) is moles per kilogram (mol/kg). A solution of concentration 1 mol/kg is also denoted as 1 molal.

The term "solvent" as used herein, refers to water (aqueous), non-aqueous compounds, or combinations thereof, that can help metal salts dissociate into metal ions and corresponding anions.

The term "non-aqueous solvent" as used herein, refers to an solvent composition that contains molecular solvents, ionic solvents, or combinations thereof. A non-aqueous solvent does not contain water.

Aqueous Solid Polymer Electrolyte

The present invention is directed to an electrolyte comprising:
  (a) at least one lithium salt in water, wherein the molality of the at least one lithium salt to water is between about 1 and about 30; and
  (b) at least one polymer.

The present invention is also directed to an electrolyte comprising:
  (a) at least one lithium salt in water, wherein the molality of the at least one lithium salt to water is between about 1 and about 30;
  (b) at least one ionic liquid; and
  (c) at least one polymer.

Lithium Salt

In some embodiments, the electrolyte comprises one, two, three, four, or five lithium salts. In some embodiments, the electrolyte comprises between 1 and 5, 1 and 4, 1 and 3, 1 and 2, 2 and 5, 2 and 4, 2 and 3, 3 and 5, 3 and 4, or 4 and 5 lithium salts. In some embodiments, the electrolyte comprises one lithium salt.

In some embodiments, the lithium salt comprises a lithium ion and an anion.

In some embodiments, the anion is selected from the group consisting of bis(trifluoromethane sulfonyl)imide (TFSI$^-$), trifluoromethane sulfonate (TF$^-$), bis(fluorosulfonyl)imide (FSI$^-$), tetrafluorophosphate (BF$_4^-$), hexafluorophosphate (PF$_6^-$), bis(perfluoroethyl sulfonyl) imide (BETI$^-$), 4,5-dicyano-2-trifluoromethanoimidazole (DCMI$^-$), [fluoro(nonafluorobutane)sulfonyl]imide (FNF$^-$), perchlorate (ClO$_4^-$), sulfate (SO$_4^-$), bis(oxalate)borate (BOB$^-$), dicyanamide (C$_2$N$_3^-$), nitrate (NO$_3^-$), acetate (CH$_3$CO$_2^-$), chloride (Cl$^-$), bromide (Br$^-$), and iodide (I$^-$).

In some embodiments, the lithium salt is selected from the group consisting of LiTFSI, LiTF, LiFSI, LiBF$_4$, LiPF$_6$, LiBETI, LiDCMI, LiFNF, LiClO$_4$, LiSO$_4$, LiBOB, LiC$_2$N$_3$, LiNO$_3$, LiCO$_2$CH$_3$, LiCl, LiBr, and LiI. In some embodiments, the lithium salt is LiTFSI. In some embodiments, the at least one lithium salt comprises LiTFSI and LiTF.

In some embodiments, the molal concentration (mol/kg) of the lithium salt in water is between about 1 and about 30, about 1 and about 25, about 1 and about 20, about 1 and 22, about 1 and about 21, about 1 and about 15, about 1 and about 10, about 1 and about 5, about 5 and about 30, about 5 and about 25, about 5 and about 22, about 5 and about 21, about 5 and about 20, about 5 and about 15, about 5 and about 10, about 10 and about 30, about 10 and about 25, about 10 and about 22, about 10 and about 21, about 10 and about 20, about 10 and about 15, about 15 and about 30, about 15 and about 25, about 15 and about 22, about 15 and about 21, about 15 and about 20, about 20 and about 30, about 20 and about 25, about 20 and about 22, about 20 and about 21, about 21 and about 30, about 21 and about 25, about 21 and about 22, about 22 and about 30, about 22 and about 25, or about 25 and about 30. In some embodiments, the molal concentration of the lithium salt in water is between about 1 and about 30. In some embodiments, the molal concentration of the lithium salt in water is about 20 and about 25. In some embodiments, the molal concentration of the lithium salt in water is about 21. In some embodiments, the molal concentration of the lithium salt in water is about 22.

In some embodiments, the at least one lithium salt and water are combined at a temperature of between about 0° C. and about 100° C., about 0° C. and about 80° C., about 0° C. and about 60° C., about 0° C. and about 40° C., about 0° C. and about 20° C., about 20° C. and about 100° C., about 20° C. and about 80° C., about 20° C. and about 60° C., about 20° C. and about 40° C., about 40° C. and about 100° C., about 40° C. and about 80° C., about 40° C. and about 60° C., about 40° C. and about 100° C., about 40° C. and about 80° C., about 40° C. and about 60° C., about 60° C. and about 100° C., about 60° C. and about 80° C., or between about 80° C. and about 100° C. In some embodiments, the at least one lithium salt is added to water at a temperature of between about 20° C. and about 40° C.

Ionic Liquid

In some embodiments, the electrolyte further comprises an ionic liquid. In some embodiments, the electrolyte further comprises one, two, three, four, or five ionic liquids. In some embodiments, the electrolyte comprises one ionic liquid.

In some embodiments, the ionic liquid is a ionic liquid at room-temperature.

In some embodiments, the ionic liquid comprises the cation imidazolium, pyrrolidinium, pyridinium, phosphonium, ammonium, guanidinium, piperidinium, or sulfonium. In some embodiments, the imidazolium cation is a 1,3-dialkyl imidazolium or 1,2,3-trialkyl imidazolium. In some embodiments, the pyrrolidinium cation is a N,N-dialkyl pyrrolidium or N-methoxyethyl N-methyl pyrrolidium. In some embodiments, the pyridinium cation is N-alkyl pyridinium. In some embodiments, the phosphonium cation is tetraalkyl phosphonium. In some embodiments, the ammonium cation is N,N,N-trialkyl-N-(2-methoxyethyl) ammonium or tetraalkyl ammonium. In some embodiments, the guanidinium cation is N,N,N',N',N'',N''-hexaalkyl guanidinium. In some embodiments, the piperidinium cation is N,N-dialkyl piperidinium. In some embodiments, the sulfonium cation is trialkyl sulfonium.

In some embodiments, the ionic liquid comprises the anion bis(trifluoromethane sulfonyl)imide (TFSI⁻), trifluoromethane sulfonate (TF⁻), bis(fluorosulfonyl)imide (FSI⁻), tetrafluorophosphate (BF₄⁻), hexafluorophosphate (PF₆⁻), bis(perfluoroethyl sulfonyl) imide (BETI⁻), 4,5-dicyano-2-trifluoromethanoimidazole (DCMI⁻), [fluoro(nonafluorobutane)sulfonyl]imide (FNF⁻), perchlorate (ClO₄⁻), sulfate (SO₄⁻), bis(oxalate)borate (BOB⁻), dicyanamide (C₂N₃⁻), nitrate (NO₃⁻), acetate (CH₃CO₂⁻), chloride (Cl⁻), bromide (Br⁻), or iodide (I⁻).

In some embodiments, the ionic liquid comprises an imidazolium salt. In some embodiments, the ionic liquid comprises an imidazolium salt selected from the group consisting of 1-ethyl-3-methylimidazolium chloride, 1-ethyl-3-methylimidazolium bromide, 1-ethyl-3-methylimidazolium iodide, 1-ethyl-3-methylimidazolium hexafluorophosphate, 1-ethyl-3-methylimidazolium tetrafluoroborate, 1-ethyl-3-methylimidazolium dicyanamide, 1-ethyl-3-methylimidazolium ethyl sulfate, 1-ethyl-3-methylimidazolium hydrogen sulfate, 1-ethyl-3-methylimidazolium trifluoro(trifluoromethyl)borate, 1-ethyl-3-methylimidazolium trifluoromethane sulfonate, 1-ethyl-3-methylimidazolium methane sulfonate, 1-butyl-3-methylimidazolium chloride, 1,3-dimethylimidazolium chloride dimethyl phosphate, 1-butyl-3-methylimidazolium bromide, 1-butyl-3-methylimidazolium chloride 1-butyl-3-methylimidazolium tetrafluoroborate, 1-butyl-3-methylimidazolium hexafluorophosphate, 1-butyl-3-methylimidazolium trifluoromethanesulfonate, 1-butyl-2,3-dimethylimidazolium chloride, 1-butyl-2,3-dimethylimidazolium hexafluorophosphate, 1-butyl-2,3-dimethylimidazolium tetrafluoroborate, 1-butyl-3-methylimidazolium bis(trifluoromethanesulfonyl)imide, 1-butyl-3-methylimidazolium tetrachloroferrate, 1-butyl-3-methylimidazolium iodide, 1-butyl-2,3-dimethylimidazolium bis(trifluoromethanesulfonyl)imide, 1-butyl-3-methylimidazolium trifluoro(trifluoromethyl)borate, 1-butyl-3-methylimidazolium tribromide, 1-butyl-3-methylimidazolium thiocyanate, 1-butyl-2,3-dimethylimidazolium trifluoromethanesulfonate, 1,3-dimethylimidazolium dimethyl phosphate, 1,3-dimethylimidazolium chloride, 1,2-dimethyl-3-propylimidazolium iodide, 2,3-dimethyl-1-propylimidazolium bis(trifluoromethanesulfonyl)imide, 1-decyl-3-methylimidazolium bis(trifluoromethanesulfonyl)imide, 1,3-dimethylimidazolium iodide, 1-hexyl-3-methylimidazolium chloride, 1-hexyl-3-methylimidazolium hexafluorophosphate, 1-hexyl-3-methylimidazolium tetrafluoroborate, 1-hexyl-3-methylimidazolium trifluoromethanesulfonate, 1-hexyl-3-methylimidazolium bromide, 1-hexyl-2,3-dimethylimidazolium iodide, 1-hexyl-3-methylimidazolium bis(trifluoromethanesulfonyl)imide, 1-(2-hydroxyethyl)-3-methylimidazolium tetrafluoroborate, 1-methyl-3-propylimidazolium iodide, 1-methyl-3-n-octylimidazolium bromide, 1-methyl-3-n-octylimidazolium chloride, 1-methyl-3-n-octylimidazolium hexafluorophosphate, 1-methyl-3-n-octylimidazolium trifluoromethanesulfonate, and 1-methyl-3-n-octylimidazolium tetrafluoroborate.

In some embodiments, the ionic liquid comprises a pyrrolidinium salt. In some embodiments, the ionic liquid comprises a pyrrolidinium salt selected from the group consisting of 1-butyl-1-methylpyrrolidinium bis(trifluoromethanesulfonyl)imide, 1-butyl-1-methylpyrrolidinium chloride, 1-butyl-1-methylpyrrolidinium bromide, 1-ethyl-1-methylpyrrolidinium tetrafluoroborate, 1-ethyl-1-methylpyrrolidinium bromide, and 1-methyl-1-propylpyrrolidinium bis(trifluoromethanesulfonyl)imide.

In some embodiments, the ionic liquid comprises a piperidinium salt. In some embodiments, the ionic liquid comprises a piperidinium salt selected from the group consisting of 1-butyl-1-methylpiperidinium bromide, 1-butyl-1-methylpiperidinium bis(trifluoromethanesulfonyl)imide, and 1-methyl-1-propylpiperidinium bromide.

In some embodiments, the ionic liquid comprises a pyridinium salt. In some embodiments, the ionic liquid comprises a pyridinium salt selected from the group consisting of 1-butylpyridinium chloride, 1-butylpyridinium bromide, 1-butylpyridinium hexafluorophosphate, 1-butyl-4-methylpyridinium bromide, 1-butyl-4-methylpyridinium hexafluorophosphate, 1-butyl-3-methylpyridinium bromide, 1-butylpyridinium tetrafluoroborate, 1-butyl-3-methylpyridinium chloride, 1-butyl-4-methylpyridinium chloride, 1-ethylpyridinium bromide, 1-ethylpyridinium chloride, 1-ethyl-3-methylpyridinium ethyl sulfate, 1-ethyl-3-(hydroxymethyl)pyridinium ethyl sulfate, 1-ethyl-3-methylpyridinium bis(trifluoromethanesulfonyl)imide, 1-hexylpyridinium hexafluorophosphate, and 1-propylpyridinium chloride.

In some embodiments, the ionic liquid comprises an ammonium salt. In some embodiments, the ionic liquid comprises an ammonium salt selected from the group consisting of amyltriethylammonium bis(trifluoromethanesulfonyl)imide, cyclohexyltrimethylammonium bis(trifluoromethanesulfonyl)imide, methyltri-n-octylammonium bis(trifluoromethanesulfonyl)imide, tetrabutylammonium bromide, tetrabutylammonium chloride, tetrabutylammonium iodide, tetrabutylammonium tetrafluoroborate, tetrahexylammonium iodide, tetraarylammonium iodide, tetra-n-octylammonium iodide, tetrabutylammonium hexafluorophosphate, tetraheptylammonium iodide, tetraarylammonium bromide, tetraarylammonium chloride, tetrabutylammonium trifluoromethanesulfonate, tetrahexylammonium bromide, tetraheptylammonium bromide, tetra-n-octylammonium bromide, tetrapropylammonium chloride, tributylmethylammonium bis(trifluoromethanesulfonyl)imide, tetrabutylammonium acetate, and trimethylpropylammonium bis(trifluoromethanesulfonyl)imide.

In some embodiments, the ionic liquid comprises a phosphonium salt. In some embodiments, the ionic liquid comprises a phosphonium salt selected from the group consisting of tributylhexadecylphosphonium bromide, tributylmethylphosphonium iodide, tributyl-n-octylphosphonium bromide, tetrabutylphosphonium bromide, tetra-n-octylphosphonium bromide, tetrabutylphosphonium tetrafluoroborate, tetrabutylphosphonium hexafluorophosphate, tributyl(2-methoxyethyl)phosphonium bis(trifluoromethanesulfonyl)imide, and tributylmethylphosphonium bis(trifluoromethanesulfonyl)imide.

In some embodiments, the ionic liquid comprises a sulfonium salt. In some embodiments, the ionic liquid comprises a sulfonium salt selected from the group consisting of trimethylsulfonium iodide, tributylsulfonium iodide, and triethylsulfonium bis(trifluoromethanesulfonyl)imide.

In some embodiments, the at least one lithium salt, at least one ionic liquid, and water are combined at a temperature of between about 0° C. and about 100° C., about 0° C. and about 80° C., about 0° C. and about 60° C., about 0° C. and about 40° C., about 0° C. and about 20° C., about 20° C. and about 100° C., about 20° C. and about 80° C., about 20° C. and about 60° C., about 20° C. and about 40° C., about 40° C. and about 100° C., about 40° C. and about 80° C., about 40° C. and about 60° C., about 40° C. and about 100° C., about 40° C. and about 80° C., about 40° C. and about 60° C., about 60° C. and about 100° C., about 60° C. and about 80° C., or between about 80° C. and about 100° C. In some embodiments, the at least one lithium salt, at least one ionic liquid, and water are combined at a temperature of between about 20° C. and about 40° C.

Polymer

In some embodiments, the electrolyte comprises one, two, three, four, or five polymers. In some embodiments, the electrolyte comprises between 1 and 5, 1 and 4, 1 and 3, 1 and 2, 2 and 5, 2 and 4, 2 and 3, 3 and 5, 3 and 4, or 4 and 5 polymers. In some embodiments, the electrolyte comprises one polymer.

In some embodiments, the at least one polymer comprises polyethylene oxide (PEO), polyacrylonitrile (PAN), polyvinylidene fluoride (PVdf), poly(methyl acrylate) (PMA), poly(methyl methacrylate) (PMMA), poly(oxymethylene) (POM), or polystyrene (PS).

In some embodiments, the weight averaged molecular weight ($M_w$) of the at least one polymer is between about 100,000 g/mol and about 20,000,000 g/mol. In some embodiments, the molecular weight ($M_w$) of the at least one polymer is between about 100,000 g/mol and about 20,000,000 g/ml, about 100,000 g/mol and about 10,000,000 g/mol, about 100,000 g/mol and about 5,000,000 g/mol, about 100,000 g/mol and about 1,000,000 g/mol, about 100,000 g/mol and about 500,000 g/mol, 100,000 g/mol and 250,000 g/mol, about 250,000 g/mol and about 20,000,000 g/ml, about 250,000 g/mol and about 10,000,000 g/mol, about 250,000 g/mol and about 5,000,000 g/mol, about 250,000 g/mol and about 1,000,000 g/mol, about 250,000 g/mol and about 500,000 g/mol, about 500,000 g/mol and about 20,000,000 g/ml, about 500,000 g/mol and about 10,000,000 g/mol, about 500,000 g/mol and about 5,000,000 g/mol, about 500,000 g/mol and about 1,000,000 g/mol, about 1,000,000 g/mol and about 20,000,000 g/ml, about 1,000,000 g/mol and about 10,000,000 g/mol, about 1,000,000 g/mol and about 5,000,000 g/mol, about 5,000,000 g/mol and about 20,000,000 g/ml, about 5,000,000 g/mol and about 10,000,000 g/mol, or about 10,000,000 g/mol and about 20,000,000 g/ml. In some embodiments, the molecular weight ($M_w$) of the at least one polymer is about 100,000 g/mol and about 4,000,000. In some embodiments, the molecular weight ($M_w$) of the at least one polymer is about 100,000 g/mol. In some embodiments, the molecular weight ($M_w$) of the at least one polymer is about 1,000,000 g/mol. In some embodiments, the molecular weight ($M_w$) of the at least one polymer is about 4,000,000 g/mol.

In some embodiments, the at least one polymer comprises a copolymer. A copolymer refers to a polymer comprising more than one type of polymer. In some embodiments, the copolymer comprises at least one first polymer block and at least one second polymer block. In some embodiments, the copolymer is a block copolymer.

In some embodiments, the block copolymer comprises at least two polymer blocks (i.e., a first polymer block and a second polymer block) that are substantially immiscible in one another. In some embodiments, the block copolymer comprises a first polymer block and a second polymer block with a number average molecular weight ratio in a range of from about 5:95 to about 95:5, from about 5:95 to about 90:10, from about 5:95 to about 80:20, from about 5:95 to about 70:30, from about 5:95 to about 60:40, from about 5:95 to about 50:50, from about 5:95 to about 40:60, from about 5:95 to about 30:70, from about 5:95 to about 20:80, from about 5:95 to about 10:90, from about 10:90 to about 95:5, from about 10:90 to about 90:10, from about 10:90 to about 80:20, from about 10:90 to about 70:30, from about 10:90 to about 60:40, from about 10:90 to about 50:50, from about 10:90 to about 40:60, from about 10:90 to about 30:70, from about 10:90 to about 20:80, from about 20:80 to about 95:5, from about 20:80 to about 90:10, from about 20:80 to about 80:20, from about 20:80 to about 70:30, from about 20:80 to about 60:40, from about 20:80 to about 50:50, from about 20:80 to about 40:60, from about 20:80 to about 30:70, from about 30:70 to about 95:5, from about 30:70 to about 90:10, from about 30:70 to about 80:20, from about 30:70 to about 70:30, from about 30:70 to about 60:40, from about 30:70 to about 50:50, from about 30:70 to about 40:60, from about 40:60 to about 95:5, from about 40:60 to about 90:10, from about 40:60 to about 80:20, from about 40:60 to about 70:30, from about 40:60 to about 60:40, from about 40:60 to about 50:50, from about 50:50 to about 95:5, from about 50:50 to about 90:10, from about 50:50 to about 80:20, from about 50:50 to about 70:30, from about 50:50 to about 60:40, from about 60:40 to about 95:5, from about 60:40 to about 90:10, from about 60:40 to about 80:20, from about 60:40 to about 70:30, from about 70:30 to about 95:5, from about 70:30 to about 90:10, from about 70:30 to about 80:20, from about 80:20 to about 95:5, from about 80:20 to about 90:10, or from about 90:10 to about 95:5.

In some embodiments, the mass ratio of the polymer to the at least one lithium salt is between about $1:10^7$ to about $10^7:1$. In some embodiments, the mass ratio of the polymer to the at least one lithium salt in the electrolyte is between about $1:10^7$ to about $10^7:1$, about $1:10^7$ to about $10^6:1$, about $1:10^7$ to about $10^5:1$, about $1:10^7$ to about $10^4:1$, about $1:10^7$ to about $1,000:1$, about $1:10^7$ to about $100:1$, about $1:10^7$ to about $10:1$, about $1:10^7$ to about $1:1$, about $1:10^6$ to about $10^7:1$, about $1:10^6$ to about $10^6:1$, about $1:10^6$ to about $10^5:1$, about $1:10^6$ to about $10^4:1$, about $1:10^6$ to about $1,000:1$, about $1:10^6$ to about $100:1$, about $1:10^6$ to about $10:1$, about $1:10^6$ to about $1:1$, about $1:10^5$ to about $10^7:1$, about $1:10^5$ to about $10^6:1$, about $1:10^5$ to about $10^5:1$, about $1:10^5$ to about $10^4:1$, about $1:10^5$ to about $1,000:1$, about $1:10^5$ to about $100:1$, about $1:10^5$ to about $10:1$, about $1:10^5$ to about $1:1$, $1:10^4$ to about $10^7:1$, about $1:10^4$ to about $10^6:1$, $1:10^4$ to about $10^5:1$, about $1:10^4$ to about $10^4:1$, about $1:10^4$ to about $1,000:1$, about $1:10^4$ to about $100:1$, about $1:10^4$ to about $10:1$, about $1:10^4$ to about $1:1$, $1:10^3$ to about $10^7:1$, about $1:10^3$ to about $10^6:1$, about $1:10^3$ to about $10^5:1$, about $1:10^3$ to about $10^4:1$, about $1:10^3$ to about $1,000:1$, about $1:10^3$ to about $100:1$, about $1:10^3$ to about $10:1$, about $1:10^3$ to about $1:1$, $1:100$ to about $10^7:1$, about $1:100$ to about $10^6:1$, about $1:100$ to about $10^5:1$, about $1:100$ to about $10^4:1$, about $1:100$ to about $1,000:1$, about $1:100$ to about $100:1$, about $1:100$ to about $10:1$, about $1:100$ to about $1:1$, $1:10$ to about $10^7:1$, about $1:10$ to about $10^6:1$, about $1:10$ to about $10^5:1$, about $1:10$ to about $10^4:1$, about $1:10$ to about $1,000:1$, about $1:10$ to about $100:1$, about $1:10$ to about $10:1$, about $1:10$ to about $1:1$, $1:1$ to about $10^7:1$, about $1:1$ to about $10^6:1$, about $1:1$ to about $10^5:1$, about $1:1$ to about $10^4:1$, about $1:1$ to about $1,000:1$, about $1:1$ to about $100:1$, or about $1:1$ to about $10:1$.

In some embodiments, the electrolyte comprises at least one lithium salt, at least one ionic liquid, and at least one polymer. In some embodiments, In some embodiments, the mass ratio of the polymer to the at least one lithium salt and at least one ionic liquid in the electrolyte is between about $1:10^7$ to about $10^7:1$. In some embodiments, the mass ratio of the polymer to the at least one lithium salt is between about $1:10^7$ to about $10^7:1$, about $1:10^7$ to about $10^6:1$, about $1:10^7$ to about $10^5:1$, about $1:10^7$ to about $10^4:1$, about $1:10^7$ to about $1,000:1$, about $1:10^7$ to about $100:1$, about $1:10^7$ to about $10:1$, about $1:10^7$ to about $1:1$, about $1:10^6$ to about $10^7:1$, about $1:10^6$ to about $10^6:1$, about $1:10^6$ to about $10^5:1$, about $1:10^6$ to about $10^4:1$, about $1:10^6$ to about $1,000:1$, about $1:10^6$ to about $100:1$, about $1:10^6$ to about $10:1$, $1:10^6$ to about $1:1$, about $1:10^5$ to about $10^7:1$, about $1:10^5$ to about $10^6:1$, about $1:10^5$ to about $10^5:1$, about $1:10^5$ to about $10^4:1$, about $1:10^5$ to about $1,000:1$, about $1:10^5$ to about $100:1$, about $1:10^5$ to about $10:1$, about $1:10^5$ to about $1:1$, $1:10^4$ to about $10^7:1$, about $1:10^4$ to about $10^6:1$, about $1:10^4$ to about $10^5:1$, about $1:10^4$ to about $10^4:1$, about $1:10^4$ to about $1,000:1$, about $1:10^4$ to about $100:1$, about $1:10^4$ to about $10:1$, about $1:10^4$ to about $1:1$, $1:10^3$ to about $10^7:1$, about $1:10^3$ to about $10^6:1$, about $1:10^3$ to about $10^5:1$, about $1:10^3$ to about $10^4:1$, about $1:10^3$ to about $1,000:1$, about $1:10^3$ to about $100:1$, about $1:10^3$ to about $10:1$, about $1:10^3$ to about $1:1$, $1:100$ to about $10^7:1$, about $1:100$ to about $10^6:1$, about $1:100$ to about $10^5:1$, about $1:100$ to about $10^4:1$, about $1:100$ to about $1,000:1$, about $1:100$ to about $100:1$, about $1:100$ to about $10:1$, about $1:100$ to about $1:1$, $1:10$ to about $10^7:1$, about $1:10$ to about $10^6:1$, about $1:10$ to about $10^5:1$, about $1:10$ to about $10^4:1$, about $1:10$ to about $1,000:1$, about $1:10$ to about $100:1$, about $1:10$ to about $10:1$, about $1:10$ to about $1:1$, $1:1$ to about $10^7:1$, about $1:1$ to about $10^6:1$, about $1:1$ to about $10^5:1$, about $1:1$ to about $10^4:1$, about $1:1$ to about $1,000:1$, about $1:1$ to about $100:1$, or about $1:1$ to about $10:1$.

In some embodiments, the aqueous polymer electrolyte further comprises a small plasticizing molecule. In some embodiments, the small plasticizing molecule is used to enhance conductivity and stability without adversely harming the mechanical properties of the aqueous polymer electrolyte. In some embodiments, the aqueous polymer electrolyte further comprises a small plasticizing molecule selected from the group consisting of monoglyme (dimethoxyethane), diglyme (bis(2-methoxyethyl) ether), triglyme, tetraglyme, or a crown ether.

In some embodiments, the at least one lithium salt, at least one polymer, and water are combined at a temperature of between about 0° C. and about 100° C., about 0° C. and about 80° C., about 0° C. and about 60° C., about 0° C. and about 40° C., about 0° C. and about 20° C., about 20° C. and about 100° C., about 20° C. and about 80° C., about 20° C. and about 60° C., about 20° C. and about 40° C., about 40° C. and about 100° C., about 40° C. and about 80° C., about 40° C. and about 60° C., about 40° C. and about 100° C., about 40° C. and about 80° C., about 40° C. and about 60° C., about 60° C. and about 100° C., about 60° C. and about 80° C., or between about 80° C. and about 100° C. In some embodiments, the at least one lithium salt, at least one polymer, and water are combined at a temperature of between about 20° C. and about 40° C.

The present invention describes a method of preparing an electrolyte, comprising:
  (a) admixing at least one lithium salt in water and at least one polymer;
  (b) pressing the admixture of (a) at a temperature between about 30° C. and about 150° C. and at a pressure between about 0.2 metric tons and about 2 metric tons.

In some embodiments, the at least one lithium salt, at least one polymer, and optionally, at least one ionic liquid, are mixed with water with a mortar and pestle until a tacky solid mixture is formed. In some embodiments, the aqueous mixture is placed in a pouch and pressed at an elevated temperature with pressure for a period of time. In some embodiments, the aqueous mixture is pressed at an elevated temperature of between about 30° C. and about 150° C., about 30° C. and about 100° C., about 30° C. and about 80° C., about 30° C. and about 60° C., about 60° C. and about 150° C., about 60° C. and about 100° C., about 60° C. and about 80° C., about 80° C. and about 150° C., about 80° C. and about 100° C., or about 100° C. and about 150° C. In some embodiments, the aqueous mixture is pressed at a pressure between about 0.2 metric ton and about 2 metric tons, about 0.2 metric ton and about 1.5 metric ton, about 0.2 metric ton and about 1 metric ton, about 0.2 metric ton and about 0.5 metric ton, about 0.5 metric ton and about 2 metric tons, about 0.5 metric ton and about 1.5 metric ton, about 0.5 metric ton and about 1 metric ton, about 1 metric ton and about 2 metric tons, about 1 metric ton and about 1.5 metric ton, or about 1.5 metric ton and about 2 metric tons. In some embodiments, the aqueous mixture is pressed at a time between about 0.5 minute and about 30 minutes, about 0.5 minute and about 20 minutes, about 0.5 minute and about 10 minutes, about 0.5 minute and about 5 minutes, about 0.5 minute and about 2 minutes, about 0.5 minute and about 1 minutes, about 1 minute and about 30 minutes, about 1 minute and about 20 minutes, about 1 minute and about 10 minutes, about 1 minute and about 5 minutes, about 1 minute and about 2 minutes, about 2 minutes and about 30 minutes, about 2 minutes and about 20 minutes, about 2 minutes and about 10 minutes, about 2 minutes and about 5 minutes, about 5 minutes and about 30 minutes, about 5 minutes and about 20 minutes, about 5 minutes and about 10 minutes, about 10 minutes and about 30 minutes, about 10 minutes and about 20 minutes, or about 20 minutes and about 30 minutes.

In some embodiments, the electrolyte is a thin film having a thickness between about 50 μm and about 300 μm. In some embodiments, the electrolyte is a thin film having a thickness between about 50 μm and about 300 μm, about 50 μm and about 250 μm, about 50 μm and about 200 μm, about 50 μm and about 150 μm, about 50 μm and about 100 μm, about 100 μm and about 300 μm, about 100 μm and about 250 μm, about 100 μm and about 200 μm, about 100 μm and about 150 μm, about 150 μm and about 300 μm, about 150 μm and about 250 μm, about 150 μm and about 200 μm, about 200 μm and about 300 μm, about 200 μm and about 250 μm, or about 250 μm and about 300 μm. In some embodiments, the electrolyte is a thin film having a thickness between about 100 μm and about 200 μm.

In some embodiments, the at least one lithium salt, at least one polymer, and optionally, at least one ionic liquid, are mixed with water and an organic solvent and solution cast as a film onto a substrate. In some embodiments, the organic solvent is selected from the group consisting of 2-methyl-tetrahydrofuran (2-MeTHF), tetrahydrofuran (THF), 4-methyldioxolane (4-MeDIOX), tetrahydropyran (THP), 1,3-dioxolane (DIOX)) glymes, 1,2-dimethoxyethane (DME/mono-glyme), propylene carbonate (PC), ethylene carbonate (EC), dimethyl carbonate (DMC), ethylmethyl carbonate (EMC), fluoroethylene carbonate (FEC), vinylene carbonate (VC), diethyl carbonate (DEC), methyl formate, dimethyl formamide, (DMF), and γ-butyrolactone (GBL). In some embodiments, the organic solvent is THF or DMF.

Properties of the Aqueous Solid Polymer Electrolytes

The conductivity of an electrolyte is its ability to pass an electric current. How well an electrolyte conducts electricity depends on concentration, mobility of ions, valence of ions, and temperature. The conductivity of an electrolyte can be measured by alternating current (AC) impedance measurements by applying an alternating electrical current to two electrodes immersed in a solution and measuring the resulting voltage.

In some embodiments, the aqueous polymer electrolyte has a high ionic conductivity. In some embodiments, the ionic conductivity of the aqueous polymer electrolyte at 25° C. is at least 1 mS/cm. In some embodiments, the ionic conductivity of the aqueous polymer electrolyte at 25° C. is between about 1 mS/cm and about 10 mS/cm, about 1 mS/cm and about 8 mS/cm, about 1 mS/cm and about 6 mS/cm, about 1 mS/cm and about 4 mS/cm, about 1 mS/cm and about 2 mS/cm, about 2 mS/cm and about 10 mS/cm, about 2 mS/cm and about 8 mS/cm, about 2 mS/cm and about 6 mS/cm, about 2 mS/cm and about 4 mS/cm, about 4 mS/cm and about 10 mS/cm, about 4 mS/cm and about 8 mS/cm, about 4 mS/cm and about 6 mS/cm, about 6 mS/cm and about 10 mS/cm, about 6 mS/cm and about 8 mS/cm, or about 8 mS/cm and about 10 mS/cm. In some embodiments, the ionic conductivity of the aqueous polymer electrolyte at 25° C. is between about 1 mS/cm and about 4 mS/cm.

The electrochemical stability window of a substance is the voltage range at which the substance is neither oxidized or reduced. The electrochemical stability window is calculated by subtracting the reduction potential (cathodic limit) from the oxidation potential (anodic limit).

Pure water has an electrochemical stability window of 1.23 V.

The electrochemical stability window for an aqueous polymer electrolyte can be measured using cyclic voltammetry (CV).

In some embodiments, the aqueous polymer electrolyte has an electrochemical stability window of between about 0.75 V and about 7 V, about 0.75 V and about 6 V, about 0.75 V and about 5.5 V, about 0.75 V and about 5 V, about 0.75 V and about 4 V, about 0.75 V and about 3 V, about 0.75 V and about 2 V, about 2 V and about 7 V, about 2 V and about 6 V, about 2 V and about 5.5 V, about 2 V and about 5 V, about 2 V and about 4 V, about 2 V and about 3 V, about 3 V and about 7 V, about 3 V and about 6 V, about 3 V and about 5.5 V, about 3 V and about 5 V, about 3 V and about 4 V, about 4 V and about 7 V, about 4 V and about 6 V, about 4 V and about 5.5 V, about 4 V and about 5 V, about 5 V and about 6.5 V, about 5 V and about 6 V, about 5 V and about 5.5 V, about 5.5 V and about 7 V, about 5.5 V and about 6 V, or about 6 V and about 7 V. In some embodiments, the aqueous polymer electrolyte has an electrochemical stability window of between about 5.5 V and about 6.0 V. In some embodiments, the aqueous polymer electrolyte has an electrochemical stability window of between about 5.5 V and about 6.5 V.

Electrochemical Devices

In some embodiments, the aqueous polymer electrolyte can be used to fabricate electrochemical devices. In some embodiments, the aqueous polymer electrolytes can be used in diversified battery chemistries, such as Li-ion chemistries of high voltage and high capacity. In some embodiments, the aqueous and hybrid electrolytes can be used in beyond Li-ion chemistries such as Li/oxygen, sulfur-based cathode materials and intercalation- or conversion-reaction type materials that include sodium, magnesium, or calcium as energy storage species.

In some embodiments, the aqueous polymer electrolytes are used to prepare an electrochemical cell. In some embodiments, the electrochemical cell comprises an anode and a cathode. In some embodiments, the electrochemical cell comprises an anode, a cathode, and a separator. In some embodiments, the electrochemical cell is a battery.

The present invention describes a electrochemical cell comprising:
(a) an aqueous polymer electrolyte comprising at least one lithium salt in water and at least one polymer, wherein the molality of the at least one lithium salt to water is between about 1 and about 30;
(b) an anode; and
(c) a cathode.

The present invention also describes a electrochemical cell comprising:
(a) an aqueous polymer electrolyte comprising at least one lithium salt in water, at least one ionic liquid, and at least one polymer, wherein the molality of the at least one lithium salt to water is between about 1 and about 30;
(b) an anode; and
(c) a cathode.

In some embodiments, the cathode (positive electrode) of the electrochemical cell used with the aqueous polymer electrolyte is selected from the group consisting of metals such as lithium, magnesium, aluminum, zinc, chromium, iron, nickel, tin, lead, copper, silver, palladium, mercury, platinum, gold, and combinations thereof; metal alloys; metal oxides; carbonaceous of varying degrees of graphitization; phosphates; and sulfides. In some embodiments, the cathode of the electrochemical cell is selected from the group consisting of aluminum and sulfur. In some embodiments, the cathode of the electrochemical cell is aluminum.

In some embodiments, the anode (negative electrode) of the electrochemical cell used with the aqueous or hybrid electrolyte is selected from the group consisting of ferrate, iron oxide, cuprous oxide, iodate, cupric oxide, mercuric oxide, cobaltic oxide, manganese dioxide, lead oxide, oxygen, nickel oxyhydroxide, nickel dioxide, silver peroxide, permanganate, and bromate. In some embodiments, the anode is selected from the group consisting of $LiCoO_2$, $LiNi_{0.33}Mn_{0.33}Co_{0.33}O_2$, $LiNi_{0.5}Mn_{1.5}O_2$, $LiCoPO_4$, $LiNiPO_4$, $LiFePO_4$, $Li_4Ti_5O_{12}$, $LiMnO_4$, $Li_2TiO_3$, $LiCoO_2$, metal oxides, phosphates, conversion-reaction materials based on metal oxides, metal halides, and metal sulfides. In some embodiments, the anode is $LiFePO_4$.

In some embodiments, the electrochemical cell includes a separator between the positive electrode and the negative electrode. In some embodiments, the separator is subjected to hydrophilic treatment or perforated such that the separator can be permeated with an aqueous electrolyte solution, allowing ions to pass through the separator. The separator may be any separator that is commonly used in batteries. Examples of the separator include polymer nonwoven fabrics, such as polypropylene nonwoven fabric and poly (phenylene sulfide) nonwoven fabric, and macroporous membranes of olefin resins, such as polyethylene and polypropylene. These can be used alone or in combination.

In some embodiments, electrochemical devices that operate using aqueous polymer electrolytes at high cell voltages are fabricated using techniques known to those of ordinary skill in the art.

In some embodiments, electrochemical devices prepared using aqueous polymer electrolytes of the invention have improved properties.

In some embodiments, battery performance can be quantified with four parameters: cell voltage, capacity, Coulombic efficiency, and cycling stability. While the first two determine the energy density, the latter two dictate the life and energy efficiency.

The "capacity retention" of a battery is a measurement of the fraction of full capacity available from a battery under a specified set of conditions, after the battery has been stored for a given amount of time.

In some embodiments, the capacity retention (in mAh/g) for a battery at a charge rate of C/3 is between about 100 mAh/g and about 150 mAh/g, about 100 mAh/g and about 140 mAh/g, about 100 mAh/g and about 130 mAh/g, about 100 mAh/g and about 120 mAh/g, about 100 mAh/g and about 110 mAh/g, about 110 mAh/g and about 150 mAh/g, about 110 mAh/g and about 140 mAh/g, about 110 mAh/g and about 130 mAh/g, about 110 mAh/g and about 120 mAh/g, about 120 mAh/g and about 150 mAh/g, about 120 mAh/g and about 140 mAh/g, about 120 mAh/g and about 130 mAh/g, about 130 mAh/g and about 150 mAh/g, about 130 mAh/g and about 140 mAh/g, or about 140 mAh/g and about 150 mAh/g. In some embodiments, the capacity retention for a battery at a charge rate of C/3 is between about 120 mAh/g and about 130 mAh/g.

In some embodiments, the Coulombic efficiency for a battery at a charge rate of C/3 is between about 60% and about 99%, about 60% and about 95%, about 60% and about 90%, about 60% and about 85%, about 60% and about 80%, about 60% and about 70%, about 70% and about 99%, about 70% and about 95%, about 70% and about 90%, about 70% and about 85%, about 70% and about 80%, about 80% and about 99%, about 80% and about 95%, about 80% and about 90%, about 80% and about 85%, about 85% and about 99%, about 85% and about 95%, about 85% and about 90%, about 90% and about 99%, about 90% and about 95%, or about 95% and about 99%. In some embodiments, the Coulombic efficiency for a battery at a charge rate of C/3 is between about 90% and about 99%.

In some embodiments, the electrochemical cell operates at a temperature of less than about 100° C., about 90° C., about 80° C., about 70° C., about 60° C., about 50° C., about 40° C., about 30° C., about 20° C., or about 10° C. In some embodiments, the electrochemical cell operates at a temperature between about −40° C. and about 100° C., about −40° C. and about 90° C., about −40° C. and about 80° C., about −40° C. and about 70° C., about −40° C. and about 60° C., about −40° C. and about 50° C., about −40° C. and about 40° C., about −40° C. and about 30° C., about −30° C. and about 100° C., about −30° C. and about 90° C., about −30° C. and about 80° C., about −30° C. and about 70° C., about −30° C. and about 60° C., about −30° C. and about 50° C., about −30° C. and about 40° C., about −30° C. and about 30° C., about −20° C. and about 100° C., about −20° C. and about 90° C., about −20° C. and about 80° C., about −20° C. and about 70° C., about −20° C. and about 60° C., about −20° C. and about 50° C., about −20° C. and about 40° C., or about −20° C. and about 30° C.

In some embodiments, the electrochemical cell has a fuel cell output voltage greater than 2.5 V, 2.8 V, 3 V, 3.2 V, 3.4 V, 3.6 V, 3.8 V, 4 V, 4.2 V, or 4.4 V. In some embodiments, the electrochemical cell has a fuel cell output voltage between 1 V and 4.5 V, 1 V and 4V, 1 V and 3.5V, 1 V and 3V, 1 V and 2.5V, 1 V and 2V, 2 V and 4.5V, 2 V and 4V, 2 V and 3.5V, 2 V and 3V, 2 V and 2.5V, 2.5 V and 4.5V, 2.5 V and 4V, 2.5 V and 3.5 V, 2.5 V and 3 V, 3 V and 4.5 V, 3 V and 4 V, 3 V and 3.5 V, 3.5 V and 4.5 V, 3.5 V and 4 V, or 4 V and 4.5 V.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Example 1

Formulation of an Air Stable Aqueous Solid Polymer Electrolyte

Figure 2:
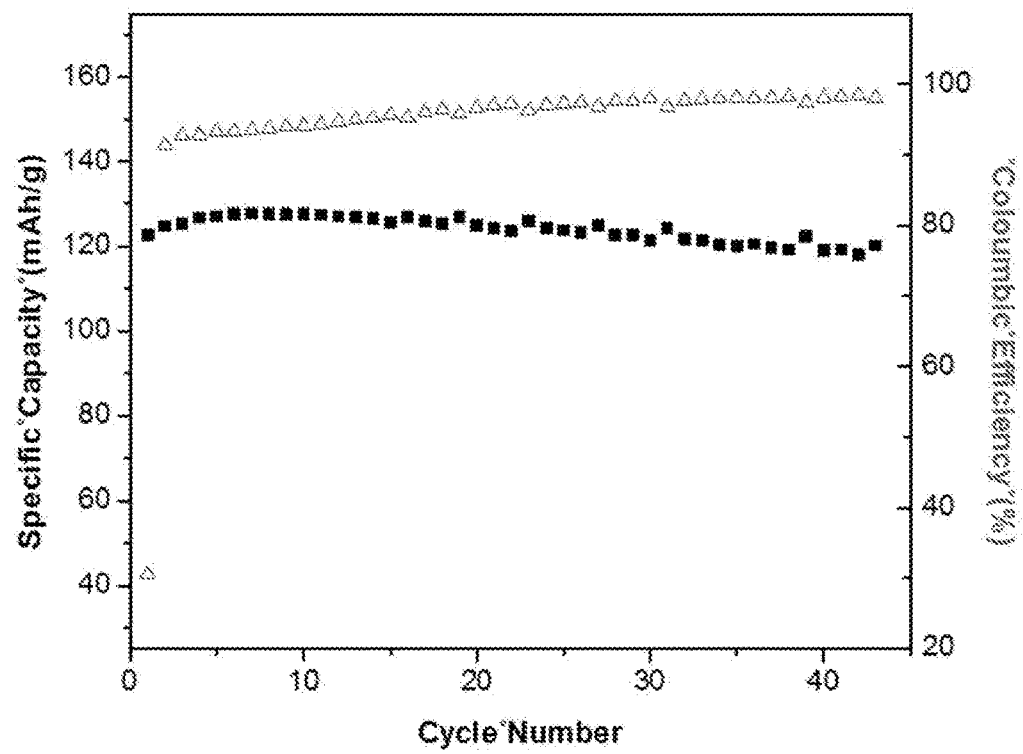
FIG. 2 is a graph showing cyclic performance at 25° C. for a solid polymer electrolyte (21 molal solution of LiTFSI salt in water mixed with PEO polymer (MW=1 million) (10:3 mass ratio) hot-pressed at 85° C.), a lithium titanate ($Li_4Ti_5O_{12}$(LTO)) anode, and a lithium manganese oxide ($LiMn_2O_4$) cathode. ■ represents specific capacity and Δ represents coloumbic efficiency.
Figure 3:
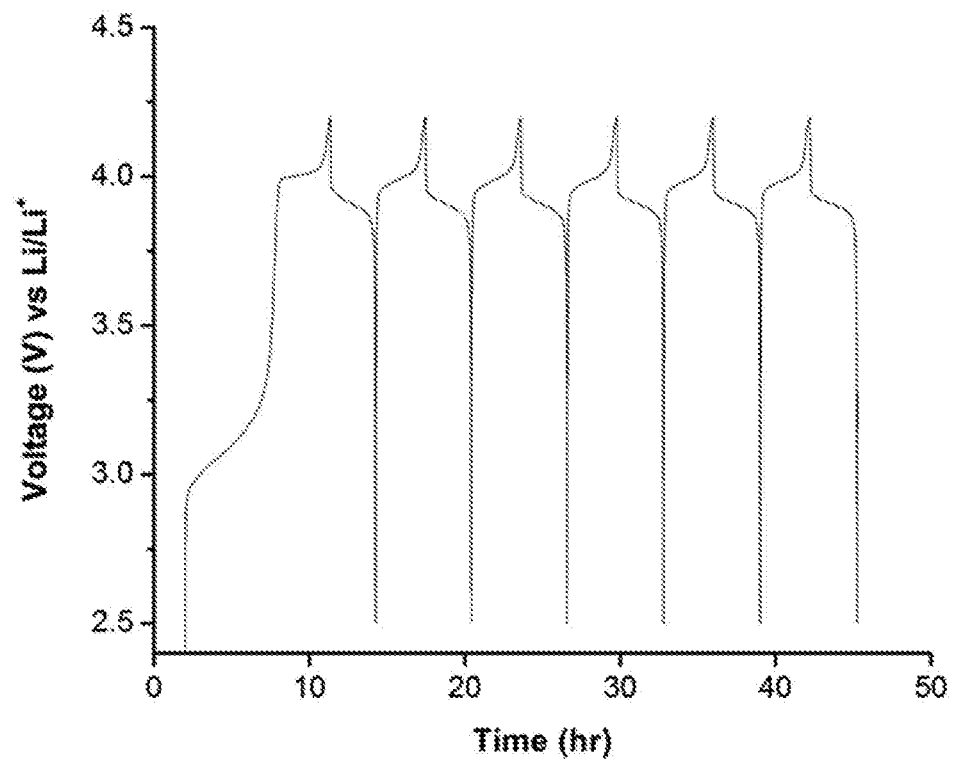
FIG. 3 is a graph showing voltage versus time for the cycling performance at 25° C. for a solid polymer electrolyte (21 molal solution of LiTFSI salt in water mixed with PEO polymer (MW=1 million) (10:3 mass ratio) hot-pressed at 85° C.), a LTO anode, and a $LiMn_2O_4$ cathode. The battery test cell was cycled at a charge rate of C/3 with ~98% coulombic efficiency delivering ~120 mA/g capacity.
Figure 4:
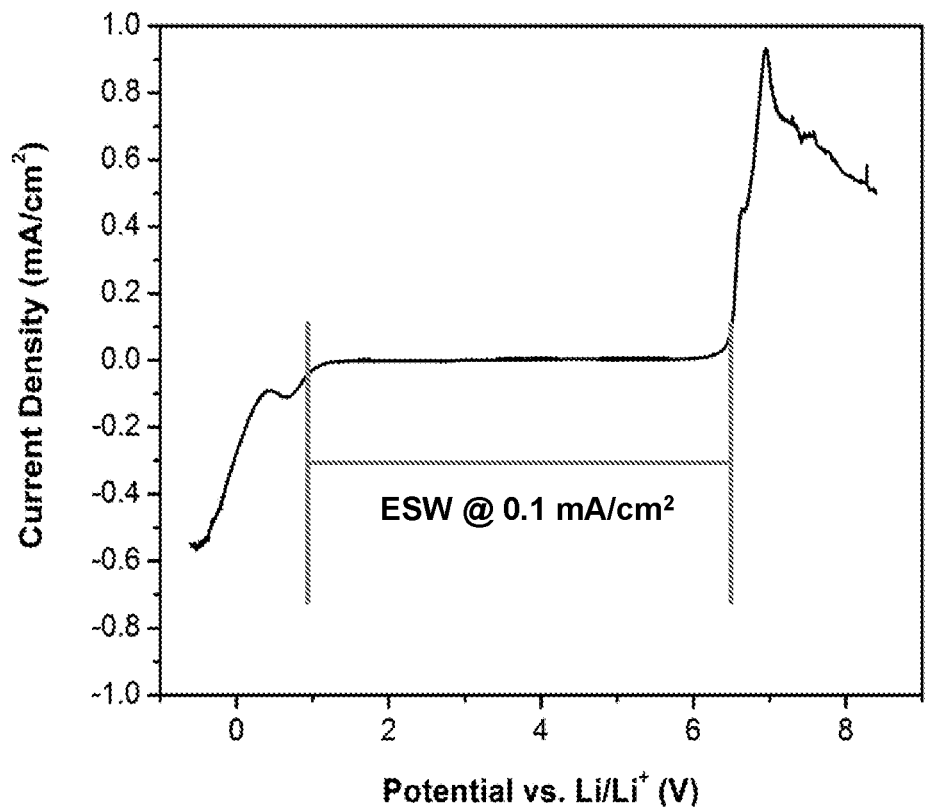
FIG. 4 is a linear sweep voltammogram for a coin cell comprising an aluminum working electrode, a solid polymer electrolyte (21 molal solution of LiTFSI salt in water mixed with PEO polymer (MW=1 million) (10:3 mass ratio) hot-pressed at 85° C.), and a $LiFePO_4$ reference electrode. The coin cell was tested at 60° C. with the electrochemical stability window tested fro 0.75 V to 6.5 V. The coin cell produced an electrochemical stability window of 5.75 V at 0.1 mA/cm$^2$.
Figure 5:
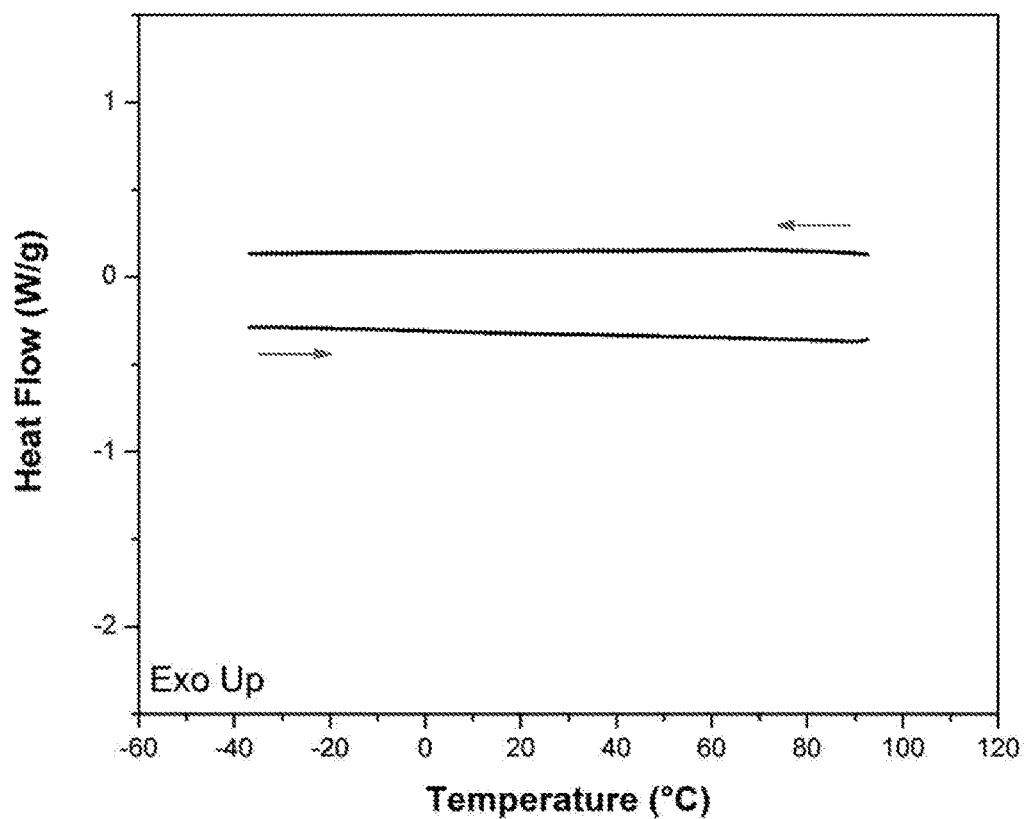
FIG. 5 is a differential scanning calorimetry (DSC) thermogram of a solid polymer electrolyte (21 molal solution of LiTFSI salt in water mixed with PEO polymer (MW=1 million) (10:3 mass ratio) hot-pressed at 85° C.) measured in the range between −40° C. and 100° C. No thermal transitions were observed.
Figure 6:
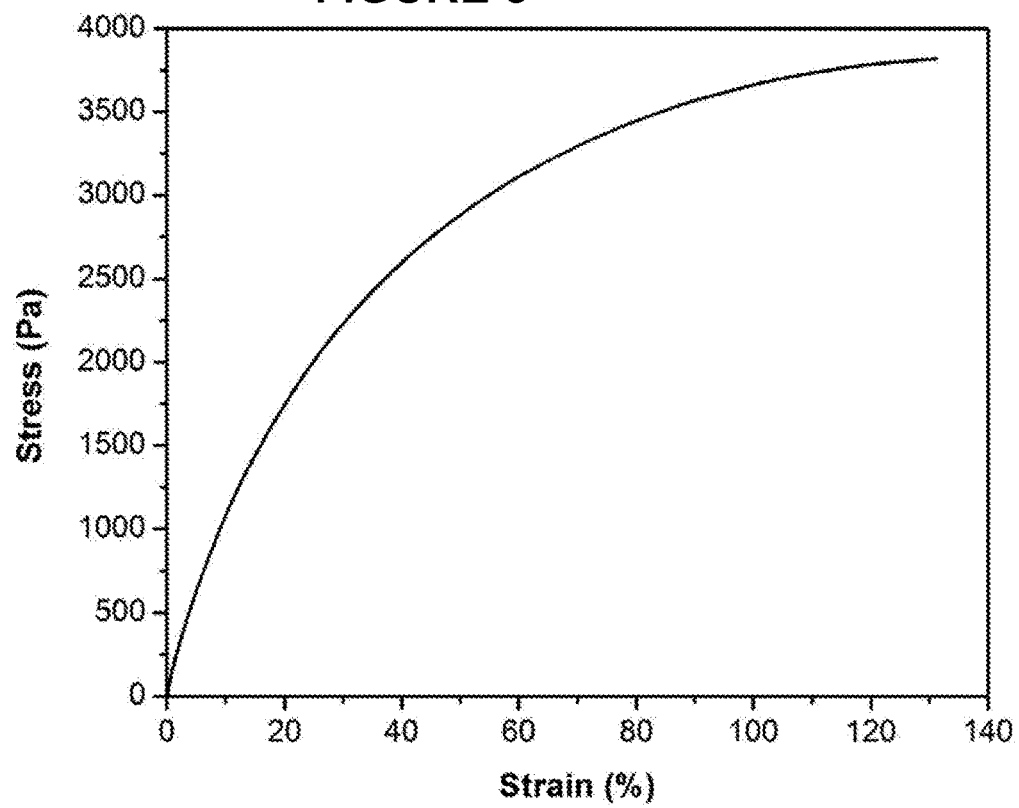
FIG. 6 is a graph showing stress versus strain response for a solid polymer electrolyte (21 molal solution of LiTFSI salt in water mixed with PEO polymer (MW=1 million) (10:3 mass ratio) hot-pressed at 85° C.) measured under tension at 25° C. using dynamic mechanical analysis. The elastic modulus of the solid polymer electrolyte was measured as G=1.51 kPa and showed a Young's modulus of E=15.1 kPa.

A concentrated 21 molal (moles salt/kg water) solution of lithium bis(trifluoromethylsulfonyl) imide (LiTFSI) salt in water is mixed with 1 million molecular weight polymer poly(ethylene oxide) (PEO) in a 10:3 mass ratio. This solid mixture is then hot-pressed at 85° C. with one metric ton of pressure for one minute. This process results in a translucent, homogeneous, mechanically pliable thin film (~150 micrometer thickness). The conductivity of the aqueous solid polymer electrolyte was measured via impedance spectroscopy and was plotted versus inverse temperature as shown in FIG. 1. FIG. 2 shows the cycling performance at 25° C. of the aqueous solid polymer electrolyte with a $Li_4Ti_5O_{12}$ anode and a $LiMn_2O_4$ cathode. The voltage-time profile for this cycling performance is shown in FIG. 3. The battery test cell was cycled at a charge rate of C/3 with ~98% coulombic efficiency delivering ~120 mA/g capacity. FIG. 4 shows linear sweep voltammetry with an Al working electrode, aqueous solid polymer electrolyte, and $LiFePO_4$ reference electrode coin cell. The electrochemical stability window (ESW) can be defined by a threshold of −0.1 $mA/cm^2$ to 0.1 $mA/cm^2$ current density response. FIG. 5 shows a differential scanning calorimetry (DSC) thermogram of the aqueous solid polymer electrolyte in the temperature range of −40° C. to 100° C., exhibiting no thermal transitions. FIG. 6 is a stress/strain response of the aqueous solid polymer electrolyte under tension at 25° C. using dynamic mechanical analysis (DMA). The elastic modulus of the aqueous solid polymer electrolyte measured using DMA was G=15.1 kPa.

Example 2

Formulation of an Air Stable Aqueous Solid Polymer Electrolyte

Figure 7:
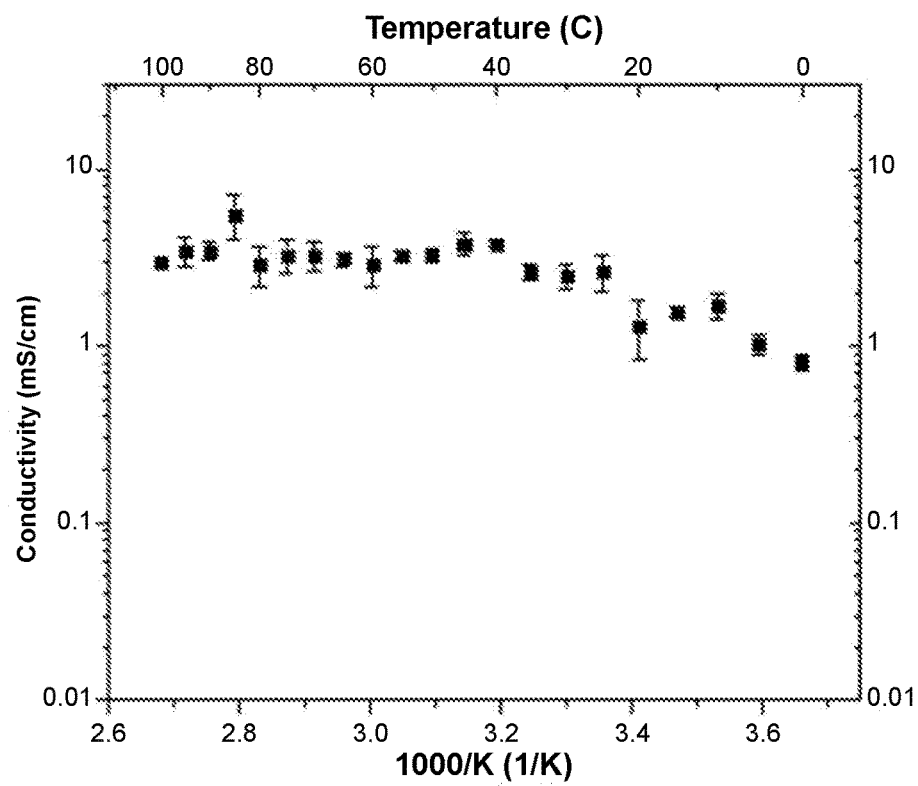
FIG. 7 is a graph showing the conductivity of a solid polymer electrolyte (22 molal solution of LiTFSI salt in water mixed with poly(acrylonitrile) (PAN) polymer (MW=100,000) (10:3 mass ratio) hot-pressed at 85° C.) between 0° C. and 100° C. The solid polymer electrolyte showed conductivity of 2.6 mS/cm at room temperature.
Figure 8:
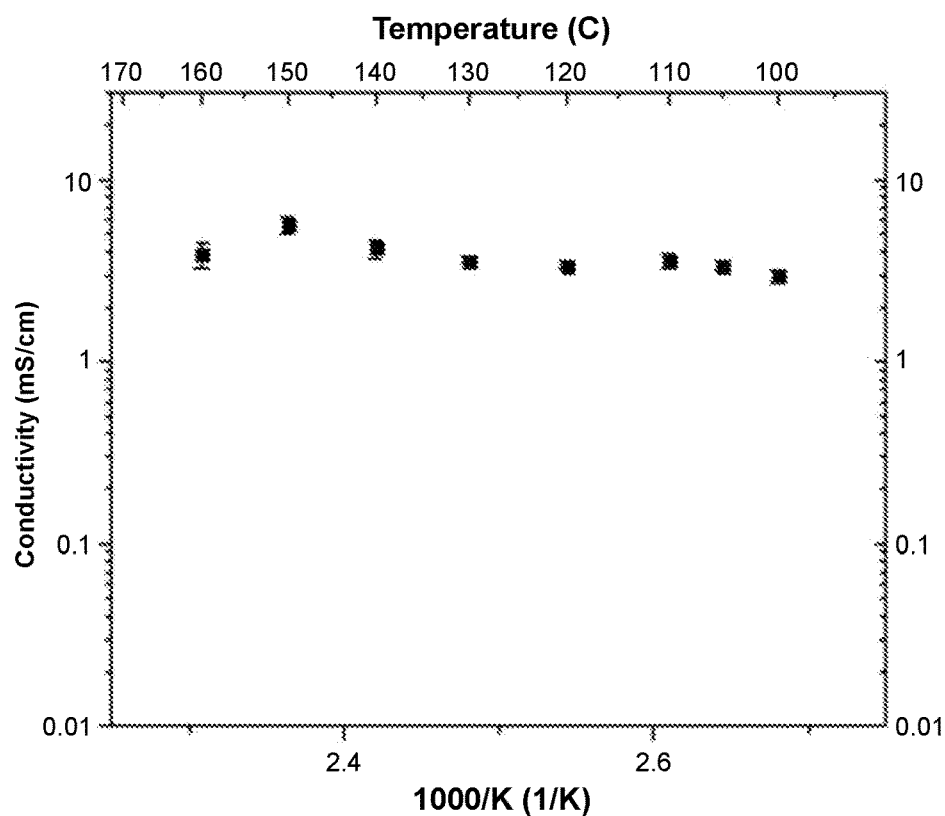
FIG. 8 is a graph showing the conductivity of a solid polymer electrolyte (22 molal solution of LiTFSI salt in water mixed with poly(acrylonitrile) (PAN) polymer (MW=100,000) (10:3 mass ratio) hot-pressed at 85° C.) between 100° C. and 160° C. The solid polymer electrolyte showed thermal stability up to 160° C. Conductivity was measured up to 160° C. at which point the cells failed.

A concentrated 22 molal solution of LiTFSI salt in water was mixed with 100,000 molecular weight polymer poly(acrylonitrile) (PAN) in a 10:3 mass ratio. This solid mixture was then hot-pressed at 85° C. with one metric ton of pressure for five minutes. The measured conductivity is shown in FIG. 7 for a temperature between 0° C. and 100° C. and in FIG. 8 for a temperature between 100° C. and 160° C. The aqueous solid polymer electrolyte showed conductivity of 2.6 mS/cm at 25° C. as well as thermal stability up to 160° C. Conductivity was measured up to 160° C. at which point the cells failed.

Example 3

Formulation of an Air Stable Solid Aqueous Polymer Electrolyte

Figure 9:
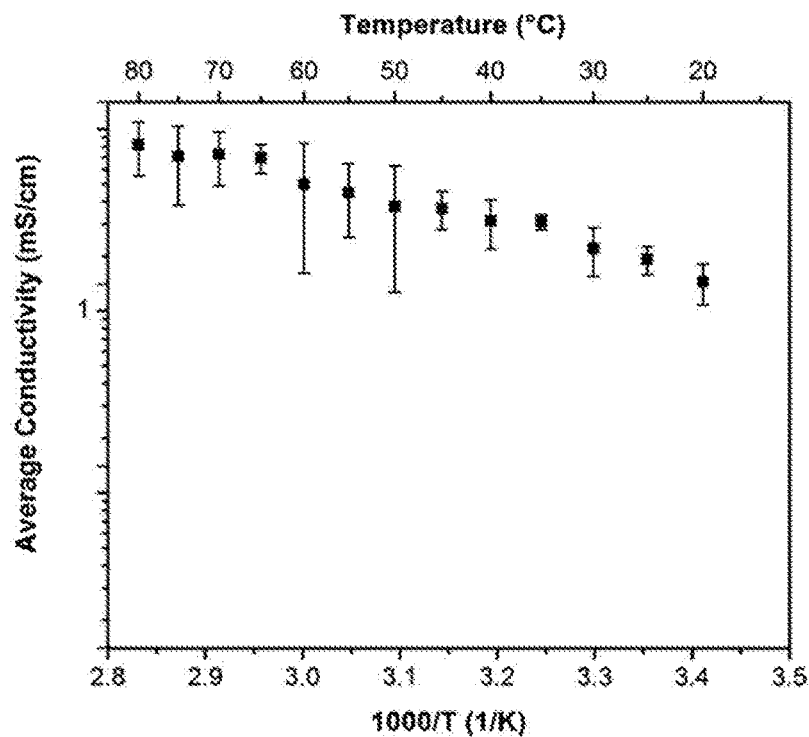
FIG. 9 is a graph showing the conductivity of a solid polymer electrolyte (21 molal solution of LiTFSI salt in water mixed with PEO polymer (MW=4 million) (10:3 mass ratio) hot-pressed at 85° C.) between 20° C. and 80° C. The solid polymer electrolyte showed conductivity of 1.92 mS/cm at room temperature.
Figure 10:
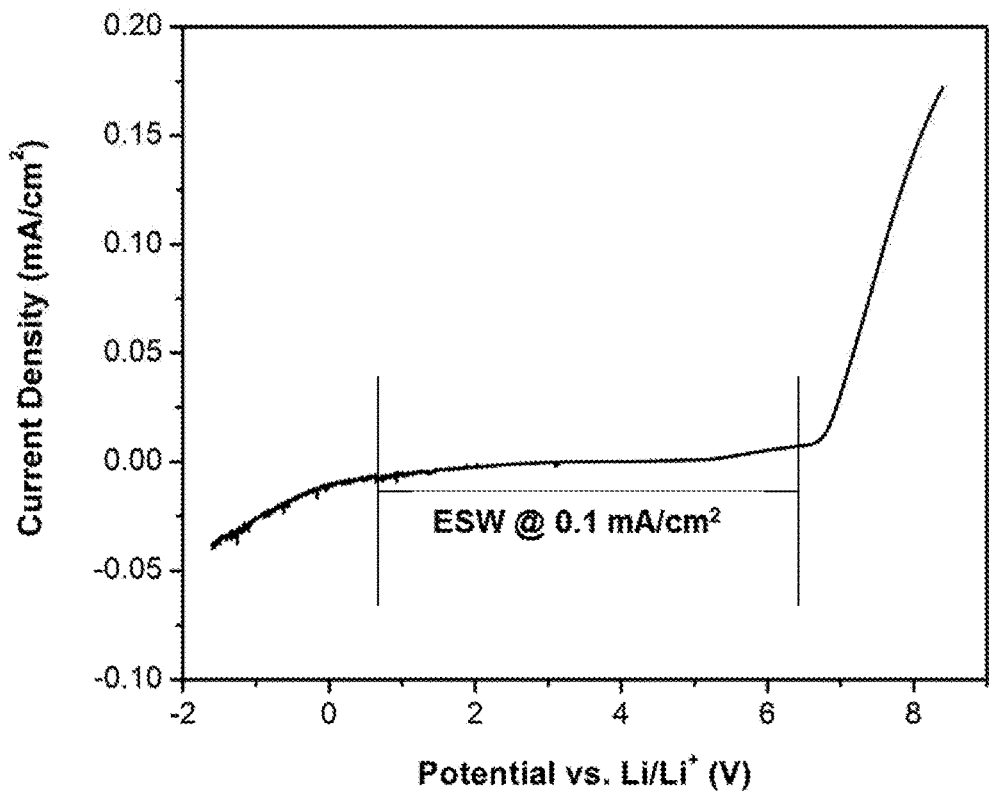
FIG. 10 is a linear sweep voltammogram for a coin cell comprising an aluminum working electrode, a solid polymer electrolyte (21 molal solution of LiTFSI salt and 7 molal solution of lithium trifluoromethane sulfonate (LiTf) salt in water mixed with PEO polymer (MW=1 million) (10:3 mass ratio) hot-pressed at 85° C.), and a LiFePO$_4$ reference electrode. The coin cell was tested at 60° C. with the electrochemical stability window tested fro 0.75 V to 6.75 V. The coin cell produced an electrochemical stability window of 6 V at 0.1 mA/cm$^2$.
Figure 11:
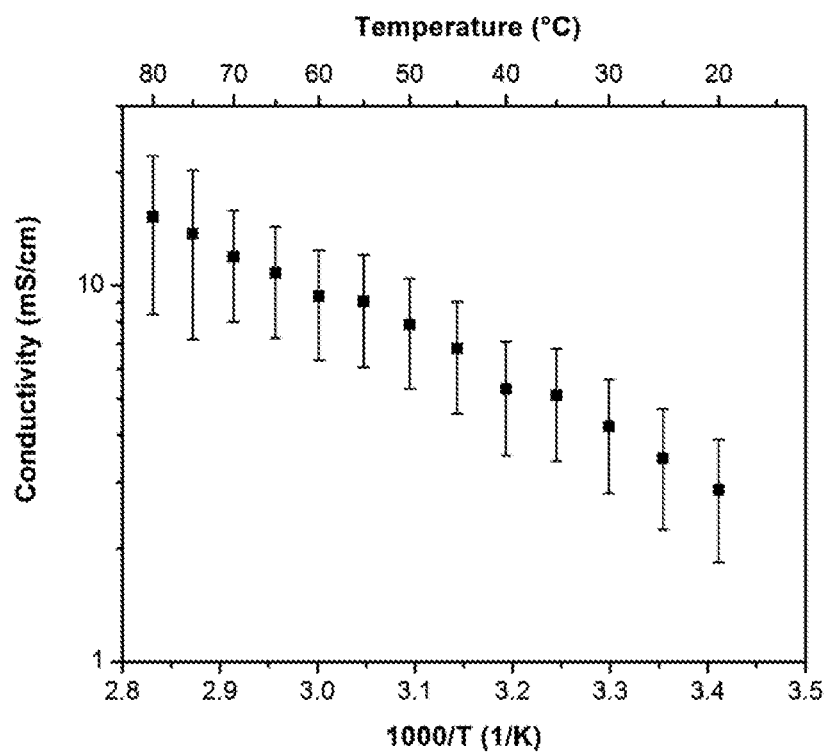
FIG. 11 is a graph of conductivity versus inverse temperature for a solid polymer electrolyte (21 molal solution of LiTFSI salt and 7 molal solution of LiOTf salt in water mixed with PEO polymer (MW=1 million) (10:3 mass ratio) hot-pressed at 85° C.) measured by impedence spectroscopy. Temperature was taken from 20° C. to 80° C. The conductivity of the solid polymer electrolyte was shown to be 3.47 mS/cm at 25° C.
Figure 12:
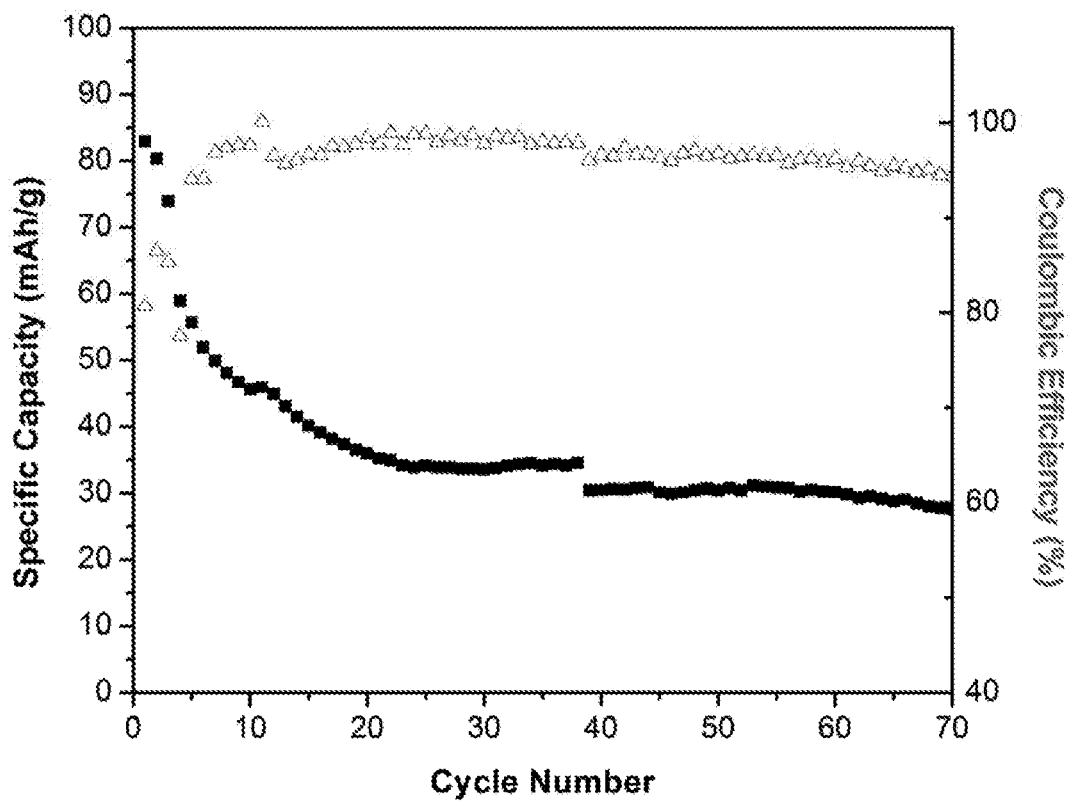
FIG. 12 is a graph showing cyclic performance at 25° C. for a solid polymer electrolyte (21 molal solution of LiTFSI salt in water mixed with PEO polymer (MW=1 million) (10:3 mass ratio) hot-pressed at 85° C.), a sulfur anode, and a LiMn$_2$O$_4$ cathode. ■ represents specific capacity and A represents coloumbic efficiency. The battery test cell was cycled at a charge rate of C/8 (average) and C/4 (final) with ~95% coulombic efficiency delivering ~30 mAh/g specific capacity.

A concentrated 21 molal solution of LiTFSI salt in water is mixed with 4 million molecular weight polymer poly(ethylene oxide) (PEO) in a 10:3 mass ratio. This solid mixture was then hot-pressed at 85° C. with one metric ton of pressure for one minute. The measured conductivity is shown in FIG. 9 for a temperature between 20° C. and 80° C. The solid aqueous polymer electrolyte shows a conductivity of 1.92 mS/cm at 25° C.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. An electrolyte, comprising:
   (a) at least one lithium salt in water; and
   (b) at least one polymer;
   wherein the molality of the lithium salt to water is between about 20 molal and about 25 molal, wherein the ionic conductivity of the electrolyte at 25° C. is between about 1 mS/cm and about 10 mS/cm, wherein the mass ratio of the at least one polymer to the at least one lithium salt is between about 1:100 and about 1:1, and wherein the electrolyte is a thin film having a thickness between about 100 μm and about 300 μm.

2. The electrolyte of claim 1, wherein the at least one lithium salt comprises an anion selected from the group consisting of bis(trifluoromethane sulfonyl)imide ($TFSI^-$), trifluoromethane sulfonate ($TF^-$), bis(fluorosulfonyl)imide ($FSI^-$), tetrafluorophosphate ($BF_4^-$), hexafluorophosphate ($PF_6^-$), bis(perfluoroethyl sulfonyl) imide ($BETI^-$), 4,5-dicyano-2-trifluoromethanoimidazole ($DCMI^-$), imide ($FNF^-$), perchlorate ($ClO_4^-$), sulfate ($SO_4^-$), bis(oxalate) borate ($BOB^-$), dicyanamide ($C_2N_3^-$), nitrate ($NO_3^-$), acetate ($CH_3CO_2^-$), chloride ($Cl^-$), bromide ($Br^-$), and iodide ($I^-$).

3. The electrolyte of claim 1, wherein the electrolyte comprises one lithium salt.

4. The electrolyte of claim 1, wherein the at least one lithium salt is LiTFSI.

5. The electrolyte of claim 1, wherein the at least one polymer is selected from the group consisting of polyethylene oxide, polyacrylonitrile, polyvinylidene fluoride, poly (methyl acrylate), poly(methyl methacrylate), poly(oxymethylene), and polystyrene.

6. The electrolyte of claim 1, wherein the at least one polymer is polyethylene oxide or polyacrylonitrile.

7. The electrolyte of claim 1, wherein the molecular weight ($M_w$) of the at least one polymer is between about 100,000 g/mol and about 4,000,000 g/mol.

8. The electrolyte of claim 1, further comprising at least one ionic liquid.

9. The electrolyte of claim 8, wherein the ionic liquid comprises an anion selected from the group consisting of bis(trifluoromethane sulfonyl)imide ($TFSI^-$), trifluoromethane sulfonate ($TF^-$), bis(fluorosulfonyl)imide ($FSI^-$), tetrafluorophosphate ($BF_4^-$), hexafluorophosphate ($PF_6^-$), bis(perfluoroethyl sulfonyl) imide ($BETI^-$), 4,5-dicyano-2-trifluoromethanoimidazole ($DCMI^-$), imide ($FNF^-$), perchlorate ($ClO_4^-$), sulfate ($SO_4^-$), bis(oxalate)borate ($BOB^-$), dicyanamide ($C_2N_3^-$), nitrate ($NO_3^-$), acetate ($CH_3CO_2^-$), chloride ($Cl^-$), bromide ($Br^-$), and iodide ($I^-$).

10. The electrolyte of claim 9, wherein the ionic liquid comprises a cation selected from the group consisting of imidazolium, pyrrolidinium, pyridinium, phosphonium, ammonium, guanidinium, piperidinium, and sulfonium.

11. The electrolyte of claim 1, wherein the mass ratio of the at least one polymer to the at least one lithium salt is 3:10.

12. The electrolyte of claim 1, wherein the electrolyte has an electrochemical stability window between about 0.75 V and about 7 V.

13. The electrolyte of claim 1, wherein the electrolyte has an electrochemical stability window between about 5.5 V and about 6.5 V.

14. The electrolyte of claim 1, wherein the ionic conductivity of the electrolyte at 25° C. is between about 1 mS/cm and about 4 mS/cm.

15. The electrolyte of claim 1, selected from the group consisting of:
   (a) the lithium salt LiTFSI and the polymer polyethylene oxide, wherein the molality of the lithium salt to water is about 21 molal, and the molecular weight of polyethylene oxide is about 1 million;
   (b) the lithium salt LiTFSI and the polymer polyacrylonitrile, wherein the molality of the lithium salt to water is about 22 molal, and molecular weight of polyacrylonitrile is about 100,000;
   (c) the lithium salt LiTFSI and the polymer polyethylene oxide, wherein the molality of the lithium salt to water is about 21 molal, and the molecular weight of polyethylene oxide is about 4 million; and
   (d) the lithium salts LiTFSI and LiTF and the polymer polyethylene oxide, wherein the molality of LiTFSI to water is about 21 molal, the molality of LiTF to water is about 7 molal, and the molecular weight of polyethylene oxide is about 1 million.

16. An electrochemical battery cell comprising:
   (a) an electrolyte comprising at least one lithium salt in water and at least one polymer;
   wherein the molality of the lithium salt to water is between about 20 molal and about 25 molal, wherein the ionic conductivity of the electrolyte at 25° C. is between about 1 mS/cm and about 10 mS/cm, wherein the mass ratio of the at least one polymer to the at least one lithium salt is between about 1:100 and about 1:1, and wherein the electrolyte is a thin film having a thickness between about 100 µm and about 300 µm;
   (b) an anode; and
   (c) a cathode.

17. The battery cell of claim 16, wherein the anode is selected from the group consisting of $LiCoO_2$, $LiNi_{0.33}Mn_{0.33}Co_{0.33}O_2$, $LiNi_{0.5}Mn_{1.5}O_2$, $LiCoPO_4$, $LiFePO_4$, $LiNiPO_4$, $Li_2TiO_3$, $LiMn_2O_4$, $LiCoO_2$, and $Li_4Ti_5O_{12}$.

18. The battery cell of claim 16, wherein the cathode is selected from the group consisting of lithium, magnesium, aluminum, zinc, chromium, iron, nickel, tin, lead, hydrogen, copper, silver, palladium, mercury, platinum, gold, molybdenum, sulfur, combinations thereof, and oxides thereof.

19. The battery cell of claim 16, wherein the cathode is aluminum and the anode is $LiFePO_4$.

20. The battery cell of claim 16, wherein the cathode is sulfur and the anode is $LiMn_2O_4$.

21. A method of preparing an electrolyte comprising:
   (a) admixing at least one lithium salt in water and at least one polymer; wherein the molality of the lithium salt to water is between about 20 molal and about 25 molal, wherein the ionic conductivity of the electrolyte at 25° C. is between about 1 mS/cm and about 10 mS/cm, and wherein the mass ratio of the at least one polymer to the at least one lithium salt is between about 1:100 and about 1:1; and
   (b) pressing the admixture of (a) at a temperature between about 30° C. and about 150° C. and at a pressure between about 0.2 metric tons and about 2 metric tons,
   to provide the electrolyte, wherein the electrolyte is a thin film having a thickness of between about 100 µm and about 300 µm.

22. The method of claim 21, wherein the electrolyte is a thin film having a thickness between about 150 µm and about 250 µm.

23. An electrolyte film obtained by the method of claim 22.

* * * * *